United States Patent Office 3,362,320
Patented Jan. 9, 1968

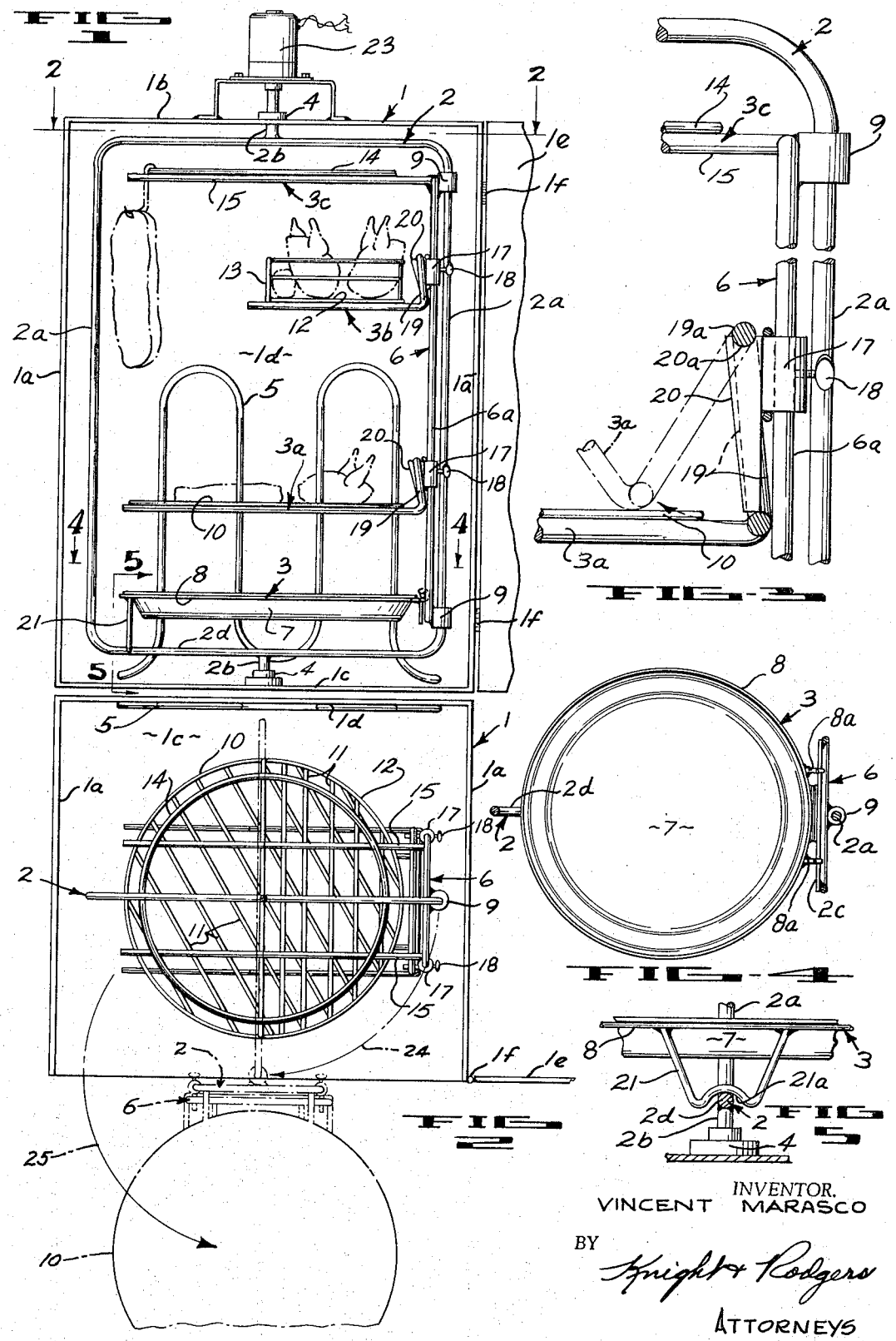

3,362,320
BROILER
Vincent Marasco, 1364 N. Western Ave.,
Los Angeles, Calif. 90027
Filed Jan. 4, 1966, Ser. No. 518,630
11 Claims. (Cl. 99—443)

ABSTRACT OF THE DISCLOSURE

A broiler has a main frame revolving about a fixed vertical axis. A subframe is mounted pivotedly on the main frame to swing about a movable second vertical axis parallel to but offset from the first axis. This arrangement allows the food-supporting grids and the like mounted on the subframe to be extended out of the housing for convenient loading, cleaning, removal, etc.

---

The present invention relates generally to cooking appliances, and more particulraly to one which may be used either as an oven or broiler and for this purpose is provided with a structure by which the food may be moved relative to a heat source.

It is a general object of this invention to provide a combined oven and broiler which is compact and versatile in operation. The unit includes a housing in which a plurality of grills or other elements for supporting the food to be cooked are mounted in a novel manner. The food may be placed directly on the grills or may be held in pans or trays resting on grills or other suitable supporting elements. These food-supporting elements are readily accessible and interchangeable or removable in order to adapt the appliance to different methods of cooking or different kinds and sizes of articles of food.

It is another object of this invention to provide a cooking appliance as herein described wherein a plurality of food-supporting elements in the form of grills, shelves, trays, pans, or the like may be selected and mounted one above the other in a housing and may be rotated as a group by means of a motor or the like to expose different sides of the food to heat from heating means within the housing.

It is a further object of the invention to provide novel means by which the food-support elements, as a unit, may be readily and easily swung entirely out of the housing, while being fully supported, to provide easy access to the cooked food and replacement or removal of the food-support elements.

Another object of the invention is the provision of novel means for detachably mounting for easy removal food-support elements on an upright support member.

A further object is to provide novel means for releasably locking the several food-support elements against swinging movement relative to a main frame, while readily releasing the supporting elements for swinging movement about the frame to a position in which the support elements extend outwardly of the housing.

The above and other objects of the present invention are achieved by providing a combined oven and broiler wherein the several food-support elements are rotatable as a unit in the housing and are swingable, as a unit, out of the housing through an open side thereof. There is provided a main frame made up of top and bottom rods and vertically extending side rods joined to the top and bottom rods, the latter having studs journaled in bearings in the top and bottom walls of the housing to provide means for mounting the frame for rotary movement about a first vertical axis. At least some of the food-support elements are detachably and vertically adjustably mounted on a second or subframe that is pivotally connected to one of the side rods of the main frame in order to establish a second vertical axis, laterally offset from the first axis, whereby the subframe and the food-support elements mounted thereon may be swung about the second axis relative to the main frame toward the open side of the housing. This swinging motion of the pivoted subframe and the assembly of support elements thereon may be combined with motion of the main frame about its first axis to bring the subframe adjacent the open side of the housing and permit the food-support elements to extend outwardly of the housing at that side while fully supported on the main frame.

How the above objects and advantages of the present invention, as well as others not specifically mentioned herein, are attained will be more readily understood by reference to the following description and to the annexed drawing, in which:

FIG. 1 is a front elevation of a combined oven and broiler embodying the present invention and showing the door at the front of the housing in the open position with only a fragmentary portion of the door illustrated.

FIG. 2 is a horizontal sectional and plan view taken on line 2—2 of FIG. 1, showing in dot-dash lines the grill assembly in the position assumed after being swung out of the housing.

FIG. 3 is an enlarged fragmentary combined elevational and sectional view of the means for adjustably and detachably mounting a grill in place on the subframe.

FIG. 4 is a horizontal cross-sectional view taken on line 4—4 of FIG. 1.

FIG. 5 is a fragmentary vertical sectional view and elevation taken on line 5—5 of FIG. 1.

As shown in the accompanying drawing, the combined oven and grill unit embodying the present invention includes a generally rectangular housing 1, typically made of suitable metal to withstand the normal ranges of temperature encountered; but, of course, any suitable material may be used. The housing has side walls 1a, top and bottom walls 1b and 1c, respectively, and a rear wall 1d. The remaining side of the housing, normally referred to as the front, is open; but the housing is provided with a door 1e hinged at 1f to a side wall 1a and which may be moved into a position to close the open side of the housing, or the housing may be opened by swinging the door to the position illustrated in FIGS. 1 and 2.

In accordance with this invention, a generally rectangular main frame structure 2 is provided inside the housing for supporting, one above another, a plurality of horizontally extending food-support elements, designated 3, 3a, 3b and 3c. From FIG. 1, it will be seen that frame 2 comprises a pair of generally parallel, horizontally extending top and bottom members joined by a pair of spaced, vertically extending side rods 2a. The frame is provided with a pair of studs 2b which are received in bearings 4 mounted on the top and bottom walls of the housing. The studs and bearings provide means by which the main frame is rotatably mounted to turn about a first vertical axis.

The food-support elements are adapted, as will be further described, to support food in such a manner that, as the main frame rotates, the elements and the food carried by them are rotated about the vertical axis through bearings 4. This movement of the food relative to heating element 5 exposes the food at different sides to the heat for cooking, as in broiling or barbecuing the food.

A second or subframe 6 is provided which is pivotally mounted on one upright side rod 2a of the main frame. Subframe 6 comprises an open, generally rectangular frame which may be made in any particular manner designed but is here shown as being made from a single continuous rod bent into the desired shape. Frame 6 is provided at two spaced positions, as at the top and bottom, with a pair of collars 9 which surround rod 2a of the main frame and thus provide a pivotal connection between the subframe and the main frame. For reasons which will become apparent, the subframe is designed to have a relative swinging movement of at least about 180° with respect to the main frame, though a full 360° is possible with the structure illustrated.

The food-support elements designated at 3, 3a, 3b and 3c are all mounted upon the subframe so that the subframe and the support elements attached thereto swing as a unit about the axis established by side rod 2a of the main frame. It will be noticed from FIGS. 1 and 2 that the second vertical axis, which is the axis of swinging movement of the subframe, is parallel to but laterally or horizontally offset from the axis of rotation of the main frame as established by bearings 4.

These food-support elements may take a wide variety of shapes and sizes depending upon the purpose for which they are intended. Starting with the lowest element 3, it may typically consist of a circular frame or support ring 8 which provides a support for pan 7. The pan may be used to support food directly or it may be used as a drip pan to catch drippings from food supported on higher elements. Ring 8 is hinged to swing in a vertical arc relative to subframe 2 by rods 8a having eyes which receive horizontally extending fixed rod 2c on the subframe.

The next member 3a above drip pan 7 is typically a circular grill 10 with a network of rods 11 providing a grill upon which food articles may be placed. The open character of the grill allows fat and juices from the food to pass through the grill and fall down onto the drip pan.

Next above the element 3a is the element 3b which is here shown as being a half-round grill 12 which may be utilized to support a basket 13 of which the walls are an open mesh having openings small enough to hold relatively small pieces of food.

The top food-support element 3c is typically an open ring 14 supported on a pair of horizontally extending rods 15. Since this is at the top of the assembly, rods 15 may be attached to the upper crossbar of frame 6, in any suitable manner, preferably being rigidly attached, as by welding, but not necessarily so. Ring 14 extends out beyond grill 12, at least in some places, in order that relatively long pieces of meat, such as spareribs, may be hung from ring 14 and extend downwardly past grill 12 without interfering with it.

Support elements 3a and 3b are detachably mounted on the subframe and are also preferably mounted in such a manner as to be vertically adjusted along the subframe to properly position the food with respect to the heat source and in the proper temperature zone of the oven. For this purpose, novel attachment means are provided, as shown in FIG. 3. This attachment means comprises a pair of sleeves or collars 17, one on each of the two upright rods 6a of subframe 6. The collars 17 slide along frame members 6a but can be held in any adjusted position by tightening the thumbscrews 18 provided one in each of the two collars 17. The two collars 17 are tied together by a crossbrace 17a and, accordingly, move as a unit. Provision of the two collars 17 at each of the food-support elements 3a and 3b assures a stable support of these elements in a horizontal position, as shown in FIG. 1, holding the elements against tilting sideways.

Novel means, also shown in FIG. 3, are provided for detachably connecting each of the grills 10 and 12 to the sliding collars 17. As may be seen in FIG. 3, grill 10 is provided with an upwardly extending loop or bail 19 which has a generally horizontal top bar 19a. Each collar 17 carries a short post 20 which is provided at its upper end with a concave depression 20a which is preferably semi-circular in shape and provides a seat into which the horizontal portion 19a of bail 19 fits, allowing the grill to be rocked vertically about the seat between the full line and broken line positions of FIG. 3. When the bar 19a is seated in depression 20a, the grill rocks of its own weight down from the dotted line position to the full line position in which the rear edge of the grill slides beneath and engages the lower end of post 20. The vertical dimension of post 20 is sized so that when the grill is in engagement with the bottom end, the grill as a whole cannot rise far enough for bail 19a to come out of seat 20a. The weight of the grill together with the weight of any food thereon biases the grill downwardly around the support provided by seat 20a, thus holding the grill firmly in place on the attachment means. The upward rotation of the grill in a counterclockwise direction about seat 20a is limited by engagement of the grill with upright rods 6a of the subframe, as may be seen in FIG. 3.

In order to detach the grill from post 20, the outer end of the grill is raised upwardly, rocking the grill in a clockwise direction about seat 20a until the grill is horizontally displaced from beneath the lower end of post 20 and reaches some such position as is shown in broken lines in FIG. 3, in which position the grill can be lifted bodily upward and freed from engagement with seat 20a. The construction of grill 12 is the same as illustrated for grill 10 and just described.

Means are provided as shown in FIGS. 1 and 5 for releasably locking the lowermost support element 3 to the bottom horizontally extending rod 2d of the main frame. This locking means is provided so that all of the food-support elements and the subframe are prevented from swinging or turning about axis 6 with respect to the main frame during cooking operations; thus ensuring that the assembly of food-supporting elements rotates as a unit with the main frame. For this purpose, the ring or frame 8 on which drip pan 7 is supported provided with a downwardly extending and generally U-shaped foot member 21, which is welded or otherwise suitably attached to the ring 8. The central lower portion of foot 21 is upwardly arched, as shown in FIG. 5, in order to provide a concave downwardly recess 21a which is adapted to receive the bottom horizontal rod 2d of the main frame. With the parts in the positions shown in FIG. 5, the weight of the support element 3, together with any food thereon, maintains this engagement between foot 21 and rod 2d. Release of this locking means is effected by lifting the outer end of frame 8 upwardly a sufficient distance to disengage rod 2d from recess 21a, and then swinging the support 8 horizontally about the axis established by main frame side member 2a. This results in swinging subframe 2 and all of the several connected food-support elements 3, 3a, 3b and 3c, as a unit, about the second axis.

When released in this manner, the entire assembly of food-supporting elements can be rotated at least as much as 180° with respect to the main frame, as shown in FIG. 2. In this position, the assembly of support elements can extend outwardly of the housing at the open side thereof, as shown, when subframe 2 is positioned adjacent the open side of the housing, as shown in the broken line position. The subframe and all support members thereon are still supported by main frame 2.

If the locking means 21a is released when the parts are in the positions shown in solid lines in FIG. 2, the assembly of food-supporting elements can be swung outwardly of the housing through the open side thereof by pulling outwardly upon the assembly, causing simultaneously (1) a rotation (arrow 24) of the main frame through an angle of approximately 90° in a clockwise direction, viewed from above, and (2) a rotation (arrow 25) of the assembly of support elements about the second axis in a counterclockwise direction for approximately 180°. The simultaneous movement of these elements about the two parallel, spaced axes results in a compound movement of the main frame and subframe which brings the subframe to a position adjacent the open side of the housing and extends the support elements outwardly through the open side of the housing. Reversing these movements returns the support elements into the housing and engages them with the main frame so that the two frames and the assembly of support elements again rotates as a unit about the first axis.

The particular advantage of the invention is that food-support elements can, while still fully supported, be moved to a position clear of the housing for loading and unloading as well as for cleaning, servicing, replacement or exchange of the support elements and so forth.

While not essential to all features of the invention, it is intended that the main frame be rotated during cooking operations. For this reason, an electric motor 23 is provided above the housing. It is provided with a suitable speed reducing gear box which has its output shaft connected in any suitable manner to the upper frame stud 2b in order to rotate the frame and the food-support elements in the housing during cooking.

The source of heat 5, as here provided, is an electrical resistance heating element comprising a number of coils, as shown in FIG. 1. These are preferably located adjacent the rear wall of the housing, although this location is not limitative upon the invention. Additional similar units may be provided, if desired; or other heat sources, such as a gas burner, may be used instead.

In having the plurality of cooking elements capable of movement as a unit about a fixed vertical axis, and also movable as a unit about a second vertical axis which in turn is rotatable about the first axis, a comparatively large cooking space may be provided within a small housing because the food-support elements may have horizontal dimensions which closely approximate the interior dimensions of the housing. At the same time, the compound movement described permits the food-support elements to be disposed outwardly of the housing, when desired.

It will be evident without the need for additional illustration that the broiler and oven may be simplified, especially when the oven characteristics are of chief interest, by eliminating subframe 6 and supporting the food-support elements of the type of 3, 3a, 3b, 3c, or any of them directly on the upright side rod 2a of the main frame. This only requires adjustable collars 17 to be mounted slidably on rod 2a, as are collars 9, instead of on the subframe. A food-support element can be supported by each of the collars in any desired selected position with respect to the heating element 5.

Heating coil 5 is here shown as extending into the lower part of the housing. Of course, it, or another coil, may extend into the upper part of the housing; but such is not necessary. Food opposite the coil is exposed directly to radiant heat from the coil when at a position opposite the coil, as at 3 and 3a. However, the heat rises and cooks at higher elevations, as at 3c, as in an oven. The food is exposed to heat from different directions by rotating the main frame; and even at the highest elevation within the housing, this is an advantage in obtaining an even cooking action.

From the foregoing description, it will be evident that various changes in the detailed construction and arrangement of the various parts comprising the present invention may occur to persons skilled in the art without departing from the spirit and scope of the invention. Accordingly, it is to be understood that the foregoing description is considered as being illustrative of, rather than limitative upon, the invention as defined by the appended claims.

I claim:

1. A combined oven and broiler of the character described, comprising:
   a housing having an open side and a door at said open side operable to open and close said side of the housing;
   heating means in the housing;
   a main frame in said housing;
   cooperating means on said main frame and said housing rotatably mounting the frame to turn about a first vertical axis;
   a food-support element;
   a subframe mounting said food-support element on said frame for rotation as a unit with said frame about said first axis;
   means on said frame and said subframe cooperably providing a second vertical axis laterally spaced from said first axis and also offset from the vertical center line of said subframe and permitting turning movement of said subframe and said food-support element as a unit about said second axis;
   and locking means releasably holding said subframe against turning movement about said second axis, said locking means being operable to release said subframe and the food-support element thereon for turning about said second axis relative to the main frame.

2. The combined oven and broiler as defined in claim 1, wherein said locking means is operable to release said subframe and the food-support element thereon for rotation of about 180° around said second axis to extend out of the housing at said open side when said subframe is positioned adjacent the open side by rotating the main frame about the first axis.

3. The combined oven and broiler as set forth in claim 1, wherein means are provided for vertically adjusting said food-support element on said subframe.

4. The combined oven and broiler as set forth in claim 1 that also includes means for detachably mounting said food-support element on said subframe.

5. The combined oven and broiler as set forth in claim 1, wherein a plurality of food-support elements is mounted on said subframe so that upon movement of said subframe about said second axis, said elements move therewith as a unit; and which includes a locking member depending from one of said elements for engagement with a part of said main frame to releasably lock said subframe and said elements against turning about said second axis relative to the main frame.

6. The combined oven and broiler as set forth in claim 1, that includes also a plurality of food-support elements and wherein one of said elements is circular and another of said elements is of smaller size than said circular element and is located below said circular element.

7. The combined oven and broiler as set forth in claim 1, which also includes cooperating means on said subframe and on said element cooperable to detachably mount said element on said subframe.

8. The combined oven and broiler as set forth in claim 1, wherein said subframe includes a pair of spaced, parallel upright rods joined to one another at their ends; said main frame having an upright portion adjacent which said upright rods are disposed; and said means for forming said second axis includes tubular members connected with said rods and pivoted on said upright portion of said frame.

9. The combined oven and broiler as set forth in claim 1, wherein said food-support element is a grid; and also including means mounting the grid on the subframe, said last-mentioned means including a tubular member slidably mounted on said subframe;
   clamp means for holding said tubular member in adjusted position on said subframe;
   an upright post fixed on said tubular member, said post having a concave seat on the upper end thereof and a horizontal shoulder at the lower end thereof;
   and a mounting bail on said grid adapted to rockably engage said seat and a portion of the grid adapted to engage beneath said shoulder by said rocking motion with the bail on the seat to releasably mount said grid on said tubular member.

10. A combined oven and broiler of the character described, comprising:
    a housing having an open side;
    heating means in the housing having a vertical extent;
    a main frame in said housing, said frame having at least one vertically extending member at one side of the frame;

cooperating means on said main frame and said housing rotatably mounting the frame to turn about a vertical axis located centrally of the frame and spaced horizontally from said vertically extending member;

a food support element providing a support area of horizontal extent;

means mounting said food-support element pivotally on said vertically extending member near one edge of the food-support element to swing between a first position in which said vertical axis passes centrally through said area and a second position in which the food-support element is substantially at one side of the main frame, the food-support element being capable of assuming a position substantially beyond the housing by combined pivotal movement of the main frame and the food-support element about their respective supporting axes;

and motor means rotating said frame and the food-support element as a unit about said vertical axis to expose food thereon to heat from said element from different directions.

11. A combined oven and broiler as in claim 10 which also includes means removably mounting the food-support element relative to the vertically extending member including:

an upright post operatively attached to the vertically extending member and having a concave seat on the upper end thereof;

and a mounting bail on the food-support element adapted to rockably engage the seat, a portion of the food-support element being adapted to engage the lower end of the post by said rocking motion with the bail on the seat to releasably hold the bail against the seat.

References Cited

UNITED STATES PATENTS

| | | | |
|---|---|---|---|
| 1,785,079 | 12/1930 | Grapp | 99—427 X |
| 1,787,469 | 1/1931 | Blier | 99—427 |
| 1,870,476 | 8/1932 | Babcock | 99—427 |
| 2,179,646 | 11/1939 | Spartalis | 99—421 |
| 2,831,420 | 4/1958 | Radman | 99—427 X |
| 2,945,598 | 7/1960 | Rallis | 99—443 X |
| 3,221,638 | 12/1965 | Wickenberg | 99—340 |

FOREIGN PATENTS 584,803  10/1959  Canada.

WALTER A. SCHEEL, *Primary Examiner.*

J. M. NEARY, *Examiner.*